Patented Sept. 19, 1922.

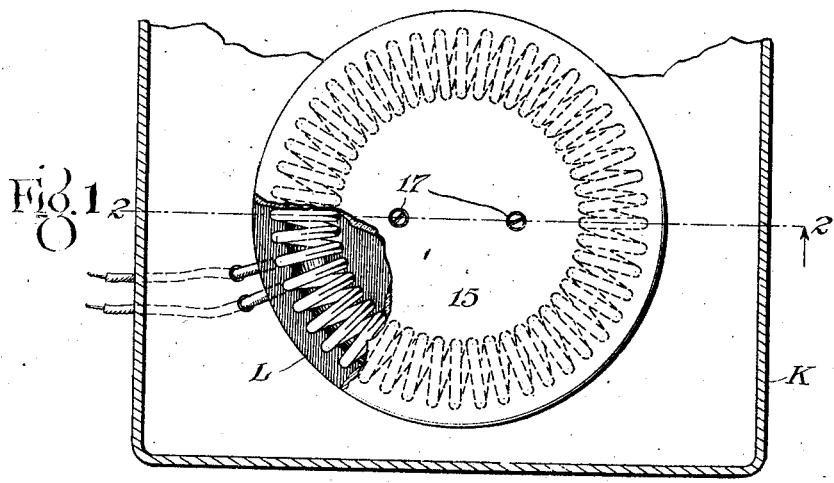
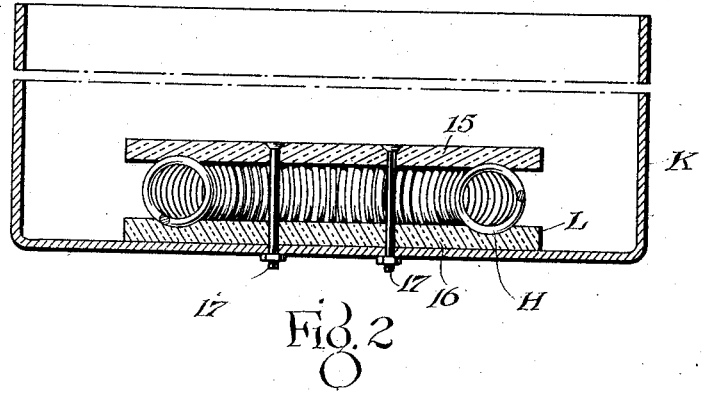
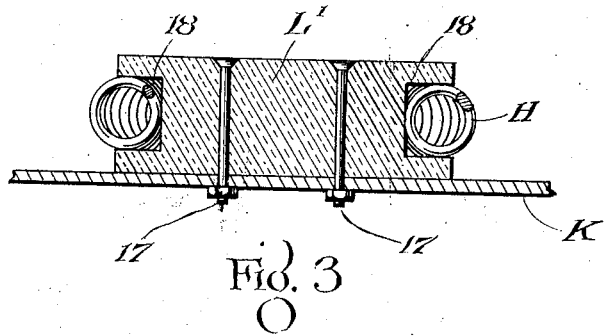

1,429,898

UNITED STATES PATENT OFFICE.

BARNETT WRIGHT MACY, OF JACKSONVILLE, FLORIDA, ASSIGNOR, BY MESNE ASSIGNMENTS, TO ELECTRIC HEATING CORPORATION, A CORPORATION OF FLORIDA.

ELECTRIC HEATER.

Application filed November 6, 1920. Serial No. 422,224.

*To all whom it may concern:*

Be it known that I, BARNETT WRIGHT MACY, a citizen of the United States, and a resident of Jacksonville, in the county of Duval and State of Florida, have invented certain new and useful Improvements in Electric Heaters, of which the following is a specification.

My invention relates generally to electric heaters, and particularly to electric heaters used in the heating of liquids for cooking purposes.

A purpose of my invention is the provision of an electric heater of the above character in which the heating element is so associated with the cooking vessel as to be directly exposed to the liquid within the vessel, thereby effecting a complete consumption of the heat generated in the heating element, and thus producing a heater of greater efficiency than electric heaters heretofore proposed. My invention is particularly adapted to the cooking of doughnuts although it is to be understood that it can be used for frying other articles of food.

I will describe two forms of electric heater embodying my invention and will then point out the novel features thereof in claims.

In the accompanying drawings:

Figure 1 is a fragmentary view showing in horizontal section one form of heater embodying my invention:

Figure 2 is a vertical sectional view taken on the line 2—2 of Figure 1.

Figure 3 is a fragmentary view showing in vertical section another form of electric heater embodying my invention.

Referring specifically to the drawings, in which similar reference characters designate similar parts, K designates a cooking vessel of the ordinary construction within which is secured an insulator designated at L, and secured within the insulator is a heating element designated at H. As shown in Figures 1 and 2, the insulator L is comprised of an upper disc 15 and a lower disc 16, both of which are formed of suitable insulating material. The lower disc 16 is somewhat thicker than the upper disc 15, and the confronting faces of these two discs are formed at corresponding points with annular grooves in which is seated the heating element H. The heating element H comprises a single length of suitable resistance wire bent in the form of a circular spiral with the ends thereof extending through the lower disc 16 and exteriorly of the vessel, as clearly shown in Figure 1. The heating element H is adapted to be secured with the grooves of the discs 15 and 16 by means of bolts 17 which extend through the two discs in the manner shown in Figure 2 and through the bottom wall of the vessel K. It will be understood that by properly adjusting the bolts the upper disc 15 may be drawn into clamping engagement with the heating element thereby locking the latter against displacement from between the discs.

As previously stated, my invention is particularly adapted for the frying of doughnuts. As is well known doughnuts are fried by submerging the same in heated grease which, in the present invention, is heated through the medium of the heating element H. It will be understood that the grease is introduced into the vessel K so as to cover the heating element H so that when current is supplied to the heating element by connecting a suitable source of current to the terminals thereof, the grease being in direct contact with the wire constituting the heating coil is thus quickly and effectively heated. The doughnuts are adapted to be placed upon the upper disc 15 or at points around the periphery of the insulator, the heating element being so associated with the discs as to prevent the contact of the doughnuts with the heating wire.

Referring now to Figure 3, I have here shown a modified form of insulator, the same being designated at L′ and comprising a single disc of insulating material formed at its periphery with an annular groove 18 in which the heating element H is arranged in the manner shown. The insulator L′ is also secured to the bottom of the vessel K by bolts 17.

From the foregoing description taken in conjunction with the accompanying drawings, it will be manifest that I have provided an electric heater of extremely simple and inexpensive construction, and furthermore a heater in which the heating element is directly exposed to the liquid to be heated thereby eliminating the numerous parts necessary in heaters of the ordinary construction, and producing a heater of great heating efficiency.

Although I have herein shown and described only two forms of electric heater embodying my invention, it is to be understood that various changes and modifications may be made herein without departing from the spirit of the invention and the spirit and scope of the appended claims.

What I claim is:

1. An electric heater comprising, a vessel, an insulator within the vessel and comprising an upper disc and a lower disc having their confronting faces formed at corresponding points with annular grooves, a resistance coil interposed between the discs and within said grooves, and means for securing one of the discs to the vessel and for securing the other disc in clamping engagement with respect to said coil.

2. An electric heater comprising, a vessel, an insulator secured within the vessel, said insulator being of disc formation and having its periphery formed with an annular groove, and a resistance coil within said groove.

BARNETT WRIGHT MACY.